US012237596B2

(12) United States Patent
Raybold

(10) Patent No.: US 12,237,596 B2
(45) Date of Patent: Feb. 25, 2025

(54) CABLE HOUSING AND CONNECTOR FOR A FLAT FLEXIBLE CABLE

(71) Applicant: TE Connectivity Solutions GmbH, Steinach (CH)

(72) Inventor: Christopher Ryan Raybold, Middletown, PA (US)

(73) Assignee: TE Connectivity Solutions GmbH (CH)

( * ) Notice: Subject to any disclaimer, the term of this patent is extended or adjusted under 35 U.S.C. 154(b) by 161 days.

(21) Appl. No.: 17/698,588

(22) Filed: Mar. 18, 2022

(65) Prior Publication Data

US 2023/0299519 A1 Sep. 21, 2023

(51) Int. Cl.

| | |
|---|---|
| ***H01R 12/59*** | (2011.01) |
| ***H01R 12/70*** | (2011.01) |
| ***H01R 12/78*** | (2011.01) |
| ***H01R 13/629*** | (2006.01) |

(52) U.S. Cl.

CPC ....... *H01R 12/592* (2013.01); *H01R 12/7005* (2013.01); *H01R 12/78* (2013.01); *H01R 13/629* (2013.01)

(58) Field of Classification Search

None

See application file for complete search history.

(56) References Cited

U.S. PATENT DOCUMENTS

| | | | | |
|---|---|---|---|---|
| 7,467,970 | B2 * | 12/2008 | Ikuta .................... | H01R 12/592 439/496 |
| 7,618,282 | B2 | 11/2009 | Wu et al. | |
| 9,252,529 | B2 | 2/2016 | Cho et al. | |
| 9,812,801 | B2 * | 11/2017 | Okura ...................... | H01B 7/08 |

* cited by examiner

*Primary Examiner* — Ross N Gushi

(57) ABSTRACT

A cable housing for a flat flexible cable includes a first cable housing having a first orientation guide and a second cable housing having a second orientation opening. A plurality of flat conductors exposed in a window extending through an insulation material of the flat flexible cable are disposed between the first cable housing and the second cable housing. The first orientation guide abuts a pair of flat conductors of the plurality of flat conductors and rotates a rotated portion of each of the flat conductors to a rotated orientation when the first orientation guide moves into the second orientation opening and the first cable housing is in a mated position with the second cable housing. The rotated orientation of the rotated portion is disposed at an angle with respect to a planar portion of each of the flat conductors in the insulation material.

20 Claims, 12 Drawing Sheets

CABLE HOUSING AND CONNECTOR FOR A FLAT FLEXIBLE CABLE

FIELD OF THE INVENTION

The present disclosure relates to a connector and, more particularly, to a connector and a cable housing of the connector for a flat flexible cable.

BACKGROUND

As understood by those skilled in the art, flat flexible cables (FFCs) or flat flexible circuits are electrical components consisting of at least one conductor (e.g., a metallic foil conductor) embedded within a thin, flexible strip of insulation. Flat flexible cables are gaining popularity across many industries due to advantages offered over their traditional "round wire" counter parts. Specifically, in addition to having a lower profile and lighter weight, FFCs enable the implementation of large circuit pathways with significantly greater ease compared to round wire-based architectures. As a result, FFCs are being considered for many complex and/or high-volume applications, including wiring harnesses, such as those used in automotive manufacturing.

The implementation or integration of FFCs into existing wiring environments is not without significant challenges. In an automotive application, by way of example only, an FFC-based wiring harness would be required to mate with perhaps hundreds of existing components, including sub-harnesses and various electronic devices (e.g., lights, sensors, etc.), each having established, and in some cases standardized, connector or interface types. Accordingly, a critical obstacle preventing the implementation of FFCs into these applications includes the need to develop quick, robust, and low resistance termination techniques which enable an FFC to be connectorized for mating with these existing connections.

A typical FFC may be realized by applying insulation material to either side of a pre-patterned thin foil conductor, and bonding the sides together via an adhesive to enclose the conductor therein. Current FFC terminals include piercing-style crimp terminals, wherein sharpened tines of a terminal are used to pierce the insulation and adhesive material of the FFC in order to attempt to establish a secure electrical connection with the embedded conductor. In harsh environmental conditions, however, such a connection suffers from plastic creep and stress relaxation of the metal, leading to inconsistent electrical connectivity between the conductor and the terminal and mechanical unreliability over time.

SUMMARY

A cable housing for a flat flexible cable includes a first cable housing having a first orientation guide and a second cable housing having a second orientation opening. A plurality of flat conductors exposed in a window extending through an insulation material of the flat flexible cable are disposed between the first cable housing and the second cable housing. The first orientation guide abuts a pair of flat conductors of the plurality of flat conductors and rotates a rotated portion of each of the flat conductors to a rotated orientation when the first orientation guide moves into the second orientation opening and the first cable housing is in a mated position with the second cable housing. The rotated orientation of the rotated portion is disposed at an angle with respect to a planar portion of each of the flat conductors in the insulation material.

BRIEF DESCRIPTION OF THE DRAWINGS

The invention will now be described by way of example with reference to the accompanying Figures, of which.

DETAILED DESCRIPTION OF THE EMBODIMENTS

Figure 1:
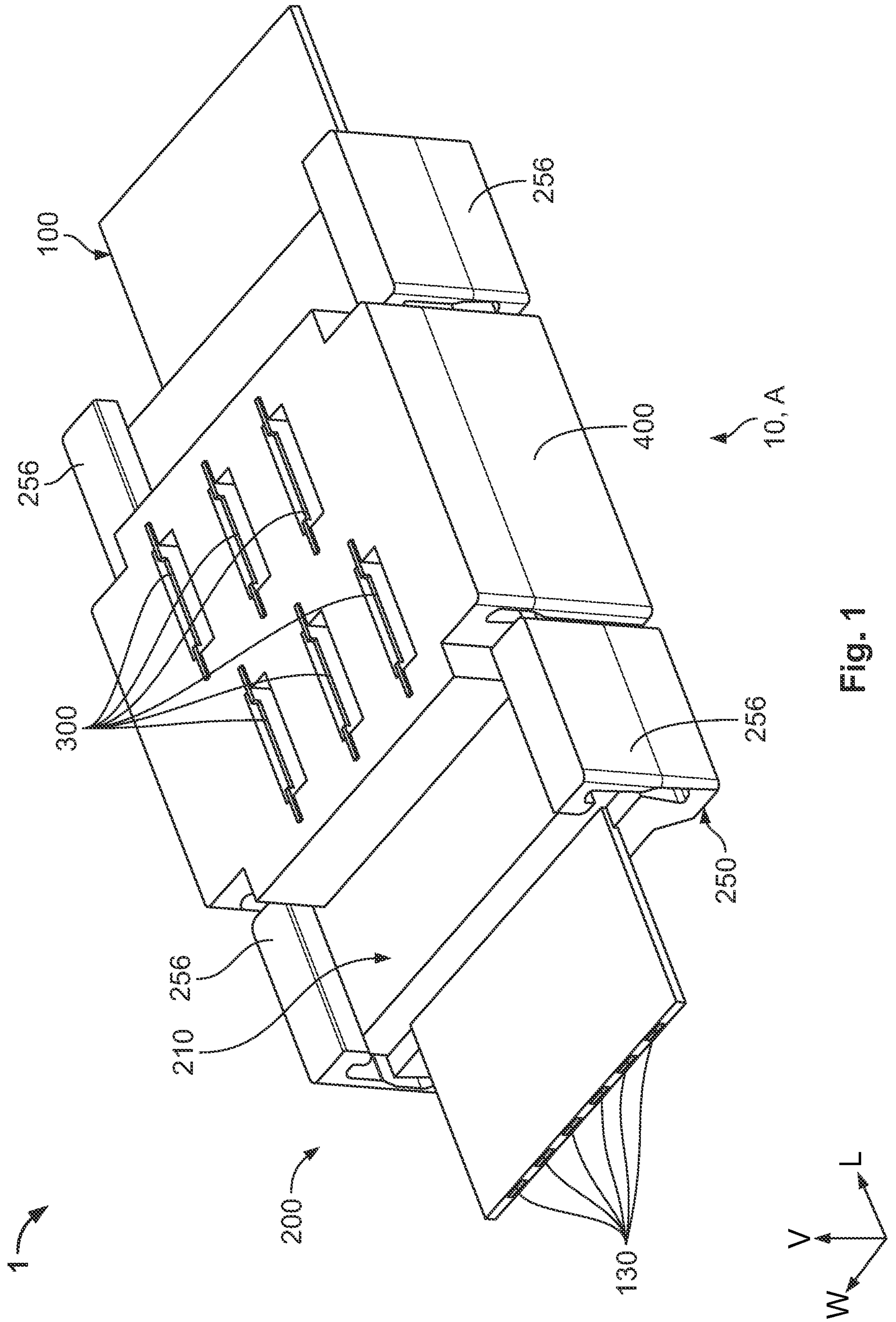
FIG. 1 is a perspective view of a connector assembly according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art. In addition, in the following detailed description, for purposes of explanation, numerous specific details are set forth in order to provide a thorough understanding of the disclosed embodiments. However, it is apparent that one or more embodiments may also be implemented without these specific details.

Throughout the specification, directional descriptors are used such as "longitudinal", "width", and "vertical". These descriptors are merely for clarity of the description and for differentiation of the various directions. These directional descriptors do not imply or require any particular orientation of the disclosed elements.

Throughout the drawings, only one of a plurality of identical elements may be labeled in a figure for clarity of the drawings, but the detailed description of the element herein applies equally to each of the identically appearing elements in the figure.

A connector assembly 1 according to an embodiment is shown in FIG. 1. The connector assembly 1 includes a flat flexible cable (FFC) 100 and a connector 10 connected to the FFC 100. The connector 10 includes a cable housing 200 disposed around the FFC 100, a plurality of terminals 300 connected to the FFC 100, and a contact housing 400 in which the terminals 300 are disposed.

Figure 2:
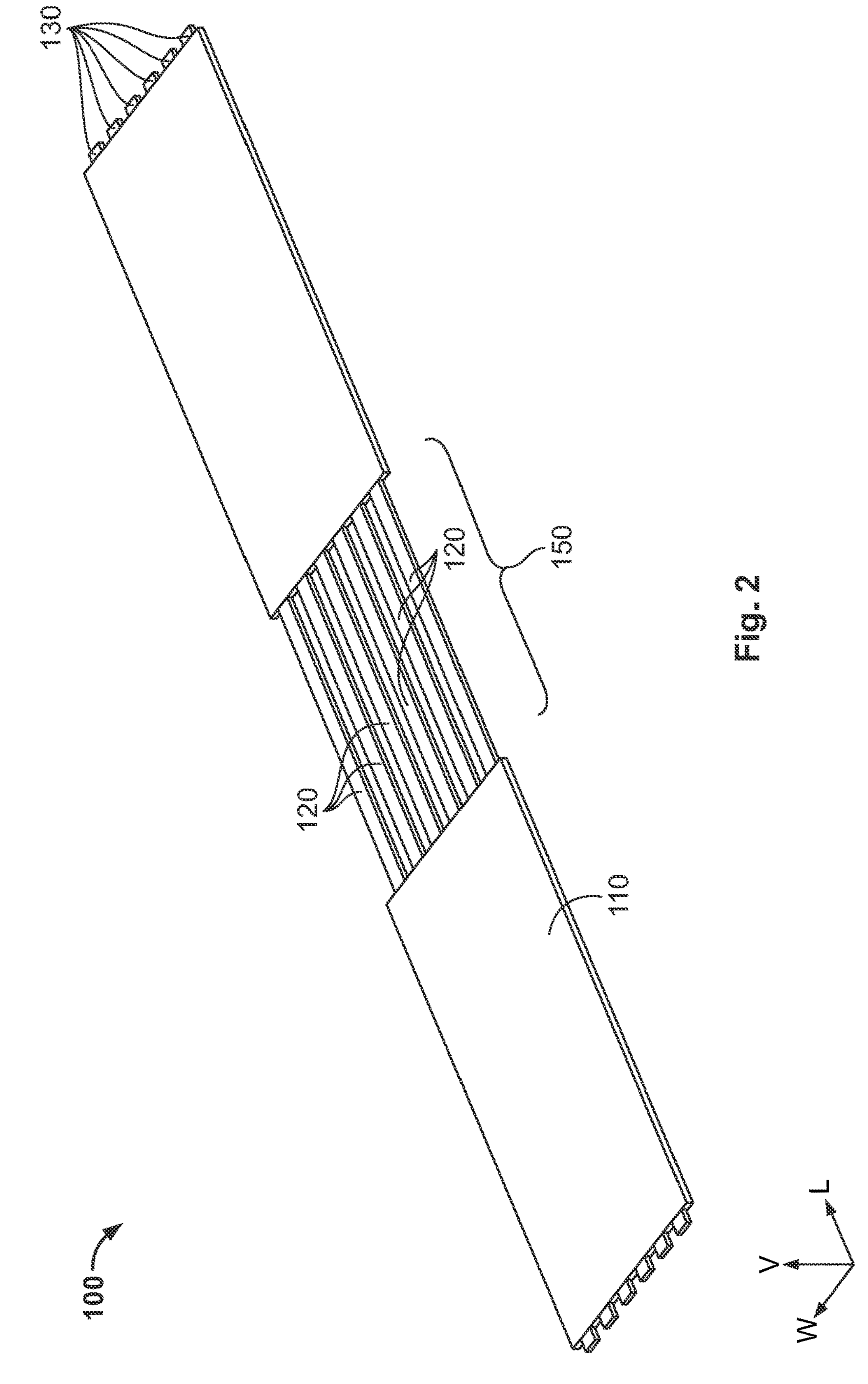
FIG. 2 is a perspective view of a flat flexible cable of the connector assembly.

The FFC 100, as shown in FIG. 2, includes an insulation material 110 and a plurality of flat conductors 120 embedded in the insulation material 110. In an embodiment, the flat conductors 120 are each a metallic foil, such as a copper foil, by way of example only, patterned in any desirable configuration. The insulation material 110, such as a polymer insulation material, may be applied to either or both sides of the flat conductors 120 via an adhesive material or extruded directly over the flat conductors 120.

As shown in FIG. 2, the FFC 100 has a window 150 in which a portion of the insulation material 110 is removed. The flat conductors 120 are exposed in the window 150. In the shown embodiment, the window 150 extends through the insulation material 110 in a central portion of the FFC 100 along a longitudinal direction L. In other embodiments, the window 150 may extend through the insulation material 110 at an end of the FFC 100 along the longitudinal direction L, or anywhere else along the FFC 100 in the longitudinal direction L.

The cable housing 200, as shown in FIG. 1, includes a first cable housing 210 and a second cable housing 250 mated with and attached to the first cable housing 210. The FFC 100 is held between the first cable housing 210 and the second cable housing 250.

Figure 3:
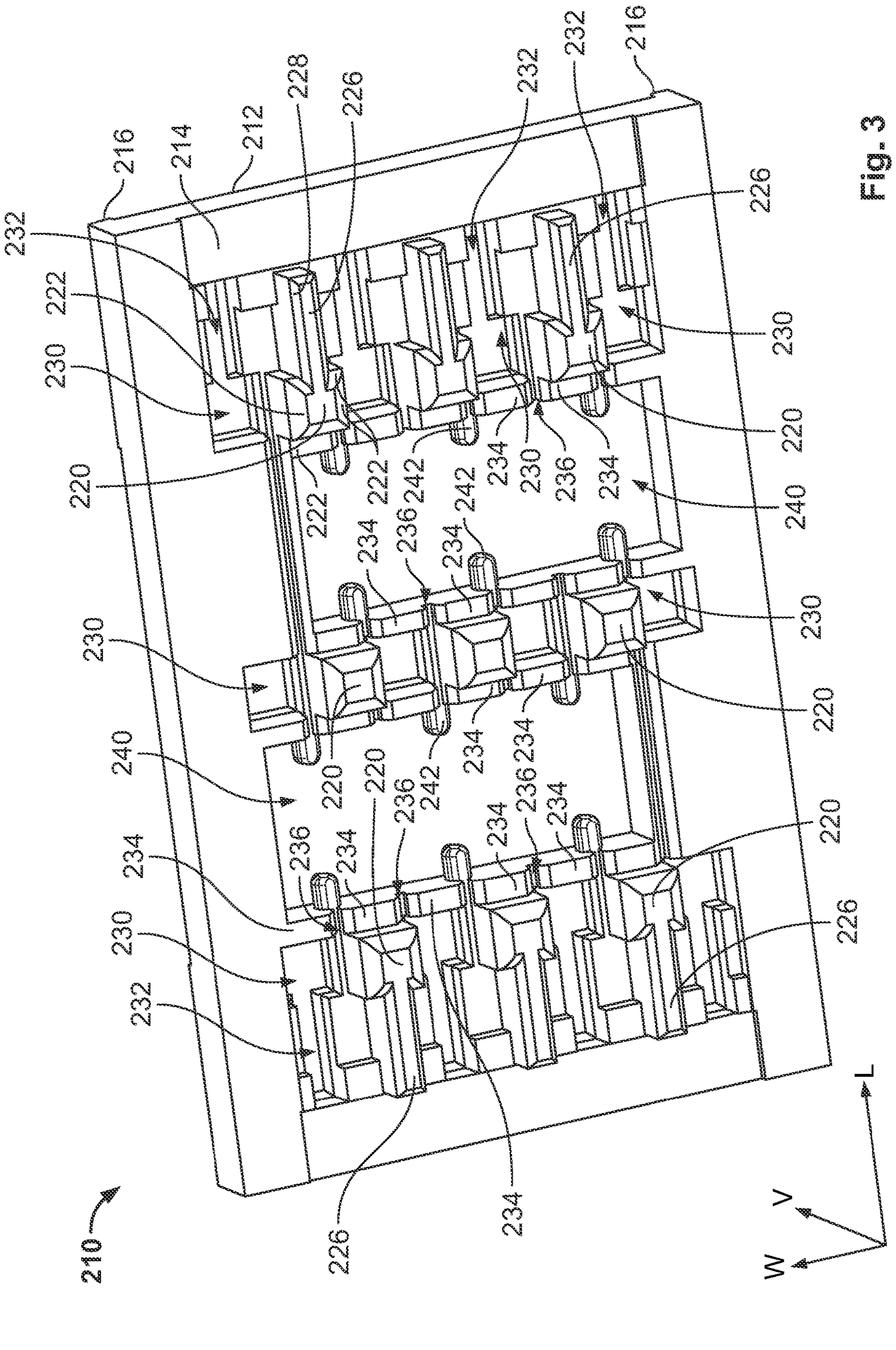
FIG. 3 is a perspective view of a first cable housing of a cable housing of a connector of the connector assembly.

The first cable housing 210, as shown in FIG. 3, has a first upper surface 212 and a first lower surface 214 opposite the first upper surface 212 in a vertical direction V perpendicular to the longitudinal direction L.

The first cable housing 210 has a plurality of first catches 216 extending from the first upper surface 212 in the vertical direction V. As shown in the embodiment of FIGS. 3 and 5D, the first catches 216 are disposed on edges of the first upper surface 212 that are opposite one another in a width direction W perpendicular to the longitudinal direction L. In the shown embodiment, the first catches 216 each have an approximately triangular cross-section with a flat side facing an interior of the first cable housing 210 and a sloped side facing an exterior of the first cable housing 210. In other embodiments, the first catches 216 may have other shapes and structures provided that the first catches 216 can releasably secure to elements of the second cable housing 250 as described in detail below.

As shown in FIG. 3, the first cable housing 210 has a plurality of first orientation guides 220 extending from the first lower surface 214 in the vertical direction V. The first orientation guides 220 each have a plurality of first curved surfaces 222 at a free end of the first orientation guide 220 opposite the first lower surface 214. In the shown embodiment, the first orientation guides 220 are each a post with an approximately square cross-section and have four first curved surfaces 222 at the free end. In other embodiments, the first orientation guides 220 can have other cross-sectional shapes with different numbers of first curved surfaces 222 at the free end.

In the embodiment shown in FIG. 3, the first cable housing 210 has the plurality of first orientation guides 220 arranged in a plurality of rows. The rows each extend along the width direction W and are spaced apart from one another in the longitudinal direction L. In the shown embodiment, the first cable housing 210 includes twelve first orientation guides 220, with four orientation guides 220 arranged in each of three rows. In other embodiments, the number of rows may be one, two, or more than three, and the first cable housing 210 can have any number of first orientation guides 220.

The first cable housing 210, as shown in FIG. 3, has a plurality of first alignment walls 226 extending from the first lower surface 214 in the vertical direction V. The first alignment walls 226 are each an elongated member extending along the longitudinal direction L; in the shown embodiment, the first alignment walls 226 are each connected to one of the first orientation guides 220 and extend from one of the first orientation guides 220. The first alignment walls 226 each have a chamfered surface 228 at a free end opposite the first lower surface 214. In the shown embodiment, the number of first alignment walls 226 is less than the number of first orientation guides 220, and the first alignment walls 226 only extend from some of the first orientation guides 220.

As shown in FIG. 3, the first cable housing 210 has a plurality of first orientation openings 230 extending into the first lower surface 214 in the vertical direction V. The first orientation openings 230 each have a shape corresponding to a shape of the first orientation guides 220 and are each positioned adjacent to one of the first orientation guides 220. In the shown embodiment, the first orientation openings 230 are disposed in the same rows as the first orientation guides 220 and are positioned in each row in an alternating manner with the first orientation guides 220. The number of first orientation openings 230 is greater than the number of first orientation guides 220 in the shown embodiment because each row begins and ends with one of the first orientation openings 230 but, in other embodiments, each row may begin and end with one of the first orientation guides 220.

The first cable housing 210, as shown in FIG. 3, has a plurality of first alignment recesses 232 extending into the first lower surface 214 in the vertical direction V. The first alignment recesses 232 each have a shape corresponding to a shape of the first alignment walls 226 and are each positioned adjacent to one of the first alignment walls 226. In the shown embodiment, the first alignment recesses 232 are each connected to one of the first orientation openings 230 and each extend from one of the first orientation openings 230 along the longitudinal direction L. In the shown embodiment, the number of first alignment recesses 232 is less than the number of first orientation openings 230, and the first alignment recesses 232 only extend from some of the first orientation openings 230.

As shown in FIG. 3, the first cable housing 210 has a plurality of first support ribs 234 extending from the first lower surface 214 in the vertical direction V with a plurality of first notches 236 disposed between the first support ribs 234. The first support ribs 234 are arranged in a plurality of rows extending along the width direction W and spaced apart from one another in the longitudinal direction L. In each row, the number of first notches 236 is equal to the number of flat conductors 120 of the FFC 100. The first notches 236 are each disposed between one of the first orientation guides 220 and one of the first orientation openings 230 in the width direction W.

The first cable housing 210 has a pair of termination passages 240 extending through the first cable housing 210 from the first upper surface 212 to the first lower surface 214, as shown in FIG. 3. The first cable housing 210 has a plurality of protrusions 242 extending along the longitudinal direction L into each of the termination passages 240.

The first cable housing 210 is formed of an insulative material. In the shown embodiment, the first cable housing 210 is monolithically formed in a single piece from the insulative material. In other embodiments, the first cable housing 210 can be assembled from a plurality of separate components to form the features of the first cable housing 210 described in detail above.

Figure 4:
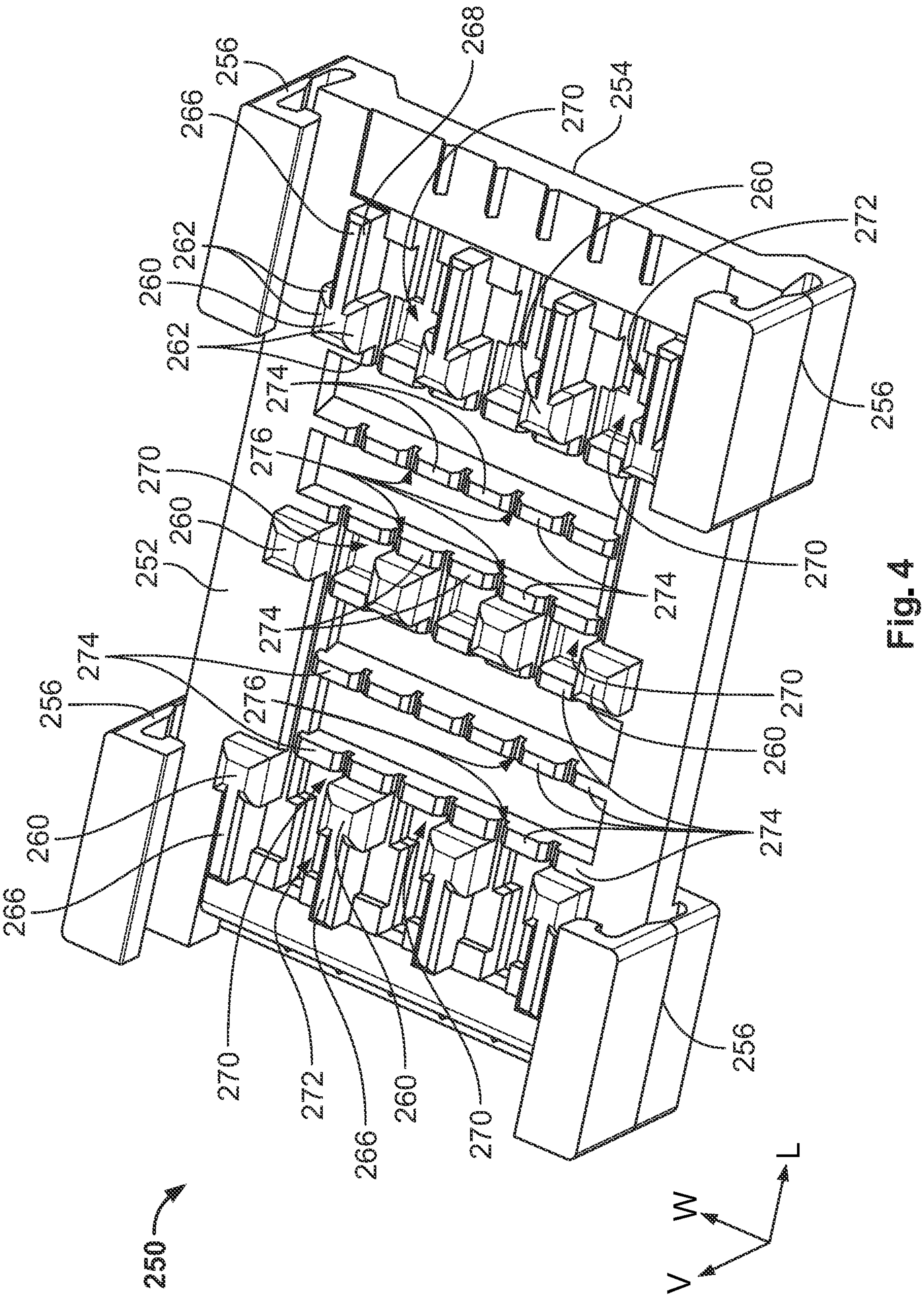
FIG. 4 is a perspective view of a second cable housing of the cable housing.

The second cable housing 250, as shown in FIG. 4, has a second upper surface 252 and a second lower surface 254 opposite the second upper surface 252 in the vertical direction V.

As shown in FIG. 4, The second cable housing 250 has a plurality of cable latch arms 256 extending from the second lower surface 254 and extending above the second upper surface 252 in the vertical direction V. The cable latch arms 256 are resiliently deflectable.

Figure 9:
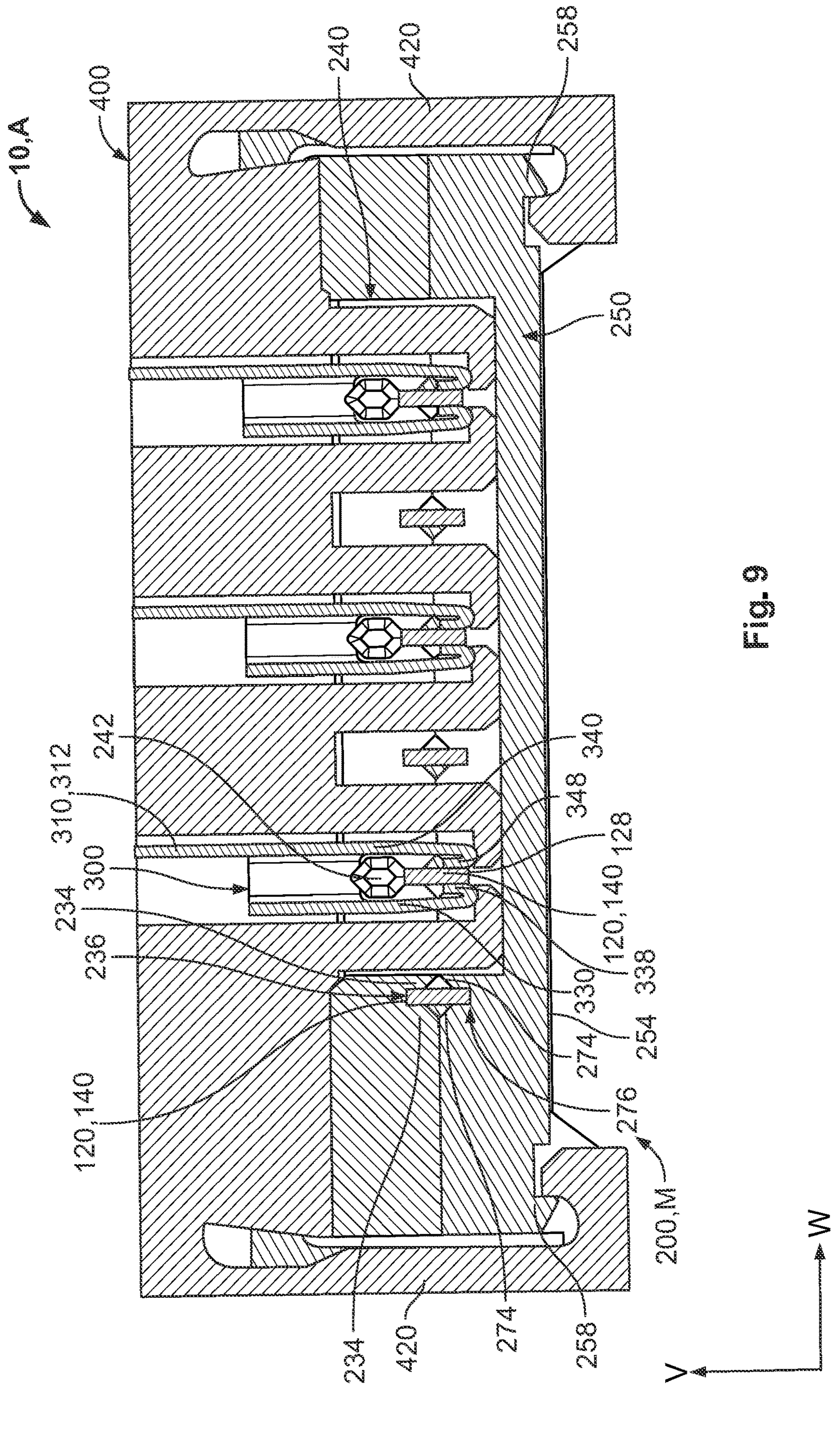
FIG. 9 is a sectional side view of the terminal in the contact housing fully inserted in the cable housing in an assembled position of the connector.

The second cable housing 250 has a plurality of second catches 258 extending from the second lower surface 254 in the vertical direction V, as shown in FIG. 9. The second catches 258 are disposed on edges of the second lower surface 254 that are opposite one another in the width direction W. In the shown embodiment, the second catches 258 each have an approximately triangular cross-section with a flat side facing an interior of the second cable housing 250 and a sloped side facing an exterior of the second cable housing 250. In other embodiments, the second catches 258 may have other shapes and structures provided that the second catches 258 can releasably secure to elements of the contact housing 400 as described in detail below.

As shown in FIG. 4, the second cable housing 250 has a plurality of second orientation guides 260 extending from the second upper surface 252 in the vertical direction V. The second orientation guides 260 each have a plurality of second curved surfaces 262 at a free end of the second orientation guide 260 opposite the second upper surface 252. In the shown embodiment, the second orientation guides 260 are each a post with an approximately square cross-section and have four second curved surfaces 262 at the free end. In other embodiments, the second orientation guides 260 can have other cross-sectional shapes with different numbers of second curved surfaces 262 at the free end; the second orientation guides 260 have a shape corresponding to the first orientation openings 230.

In the embodiment shown in FIG. 4, the second cable housing 250 has the plurality of second orientation guides 260 arranged in a plurality of rows. The rows each extend along the width direction W and are spaced apart from one another in the longitudinal direction L. In the shown embodiment, the second cable housing 250 includes twelve second orientation guides 260, with four second orientation guides 260 arranged in each of three rows. In other embodiments, the number of rows may be one, two, or more than three, and the second cable housing 250 can have any number of second orientation guides 260. The number and arrangement of the second orientation guides 260 corresponds to the number and arrangement of first orientation openings 230.

As shown in FIG. 4, the second cable housing 250 has a plurality of second alignment walls 266 extending from the second upper surface 252 in the vertical direction V. The second alignment walls 266 are each an elongated member extending along the longitudinal direction L; in the shown embodiment, the second alignment walls 266 are each connected to one of the second orientation guides 260 and extend from one of the second orientation guides 260. The second alignment walls 266 each have a chamfered surface 268 at a free end opposite the second upper surface 252. In the shown embodiment, the number of second alignment walls 266 is less than the number of second orientation guides 260, and the second alignment walls 266 only extend from some of the second orientation guides 260.

The second cable housing 250, as shown in FIG. 4, has a plurality of second orientation openings 270 extending into the second upper surface 252 in the vertical direction V. The second orientation openings 270 each have a shape corresponding to a shape of the first orientation guides 220 and are each positioned adjacent to one of the second orientation guides 260. In the shown embodiment, the second orientation openings 270 are disposed in the same rows as the second orientation guides 260 and are positioned in each row in an alternating manner with the second orientation guides 260. The number of second orientation openings 270 is less than the number of second orientation guides 260 in the shown embodiment because each row begins and ends with one of the second orientation guides 260 but, in other embodiments, each row may begin and end with one of the second orientation openings 270.

The second cable housing 250, as shown in FIG. 4, has a plurality of second alignment recesses 272 extending into the second upper surface 252 in the vertical direction V. The second alignment recesses 272 each have a shape corresponding to a shape of the first alignment walls 226 and are each positioned adjacent to one of the second alignment walls 266. In the shown embodiment, the second alignment recesses 272 are each connected to one of the second orientation openings 270 and each extend from one of the second orientation openings 270 along the longitudinal direction L. In the shown embodiment, the number of second alignment recesses 272 is less than the number of second orientation openings 270, and the second alignment recesses 272 only extend from some of the second orientation openings 270.

As shown in FIG. 4, the second cable housing 250 has a plurality of second support ribs 274 extending from the second lower surface 254 in the vertical direction V with a plurality of second notches 276 disposed between the second support ribs 274. The second support ribs 274 are arranged in a plurality of rows extending along the width direction W and spaced apart from one another in the longitudinal direction L. In each row, the number of second notches 276 is equal to the number of flat conductors 120 of the FFC 100. The second notches 276 are each disposed between one of the second orientation guides 260 and one of the second orientation openings 270 in the width direction W.

The second cable housing 250 is formed of an insulative material. In the shown embodiment, the second cable housing 250 is monolithically formed in a single piece from the insulative material. In other embodiments, the second cable housing 250 can be assembled from a plurality of separate components to form the features of the second cable housing 250 described in detail above.

The assembly of the cable housing 200 with the FFC 100 will now be described in greater detail primarily with reference to FIGS. 5A-5E.

Figure 5A:
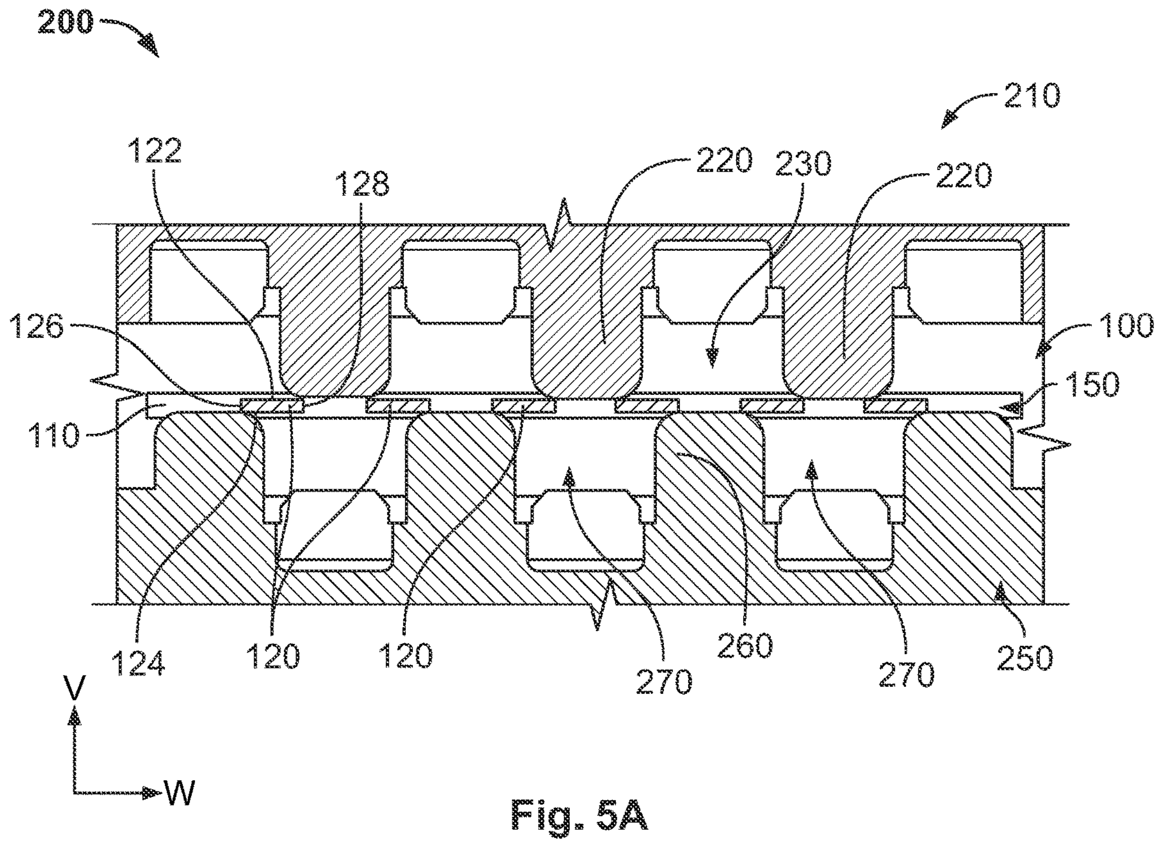
FIG. 5A is a sectional side view of a first step of mating the first cable housing with the second cable housing around flat conductors of the flat flexible cable.

The window 150 of the FFC 100 is positioned between the first cable housing 210 and the second cable housing 250 in the vertical direction V, with the first cable housing 210 and the second cable housing 250 separated from one another in the vertical direction V as shown in FIG. 5A. The first orientation guides 220 are each aligned with one of the second orientation openings 270 in the vertical direction V and the second orientation guides 260 are each aligned with one of the first orientation openings 230 in the vertical direction V.

The flat conductors 120 exposed in the window 150 are positioned with a first surface 122 of each flat conductor 120 facing the first cable housing 210 and a second surface 124 of each flat conductor 120 opposite the first surface 122 facing the second cable housing 250. Each flat conductor 120 has a first end 126 and a second end 128 opposite the first end 126, with the first end 126 and the second end 128 perpendicular to the first surface 122 and the second surface 124. Only one of the flat conductors 120 is labeled with reference numbers in FIGS. 5A-5E for clarity of the drawings, but the description applies equally to each of the flat conductors 120 shown in FIGS. 5A-5E.

In a state of the FFC 100 shown in FIGS. 2 and 5A, the flat conductors 120 extend in a single plane throughout the insulation material 110 and in the window 150. The first surface 122 and the second surface 124 of the flat conductors 120, in both the insulation material 110 and in the window 150, are parallel with an upper surface and a lower surface of the insulation material 110 in the state shown in FIGS. 2 and 5A.

Figure 5B:
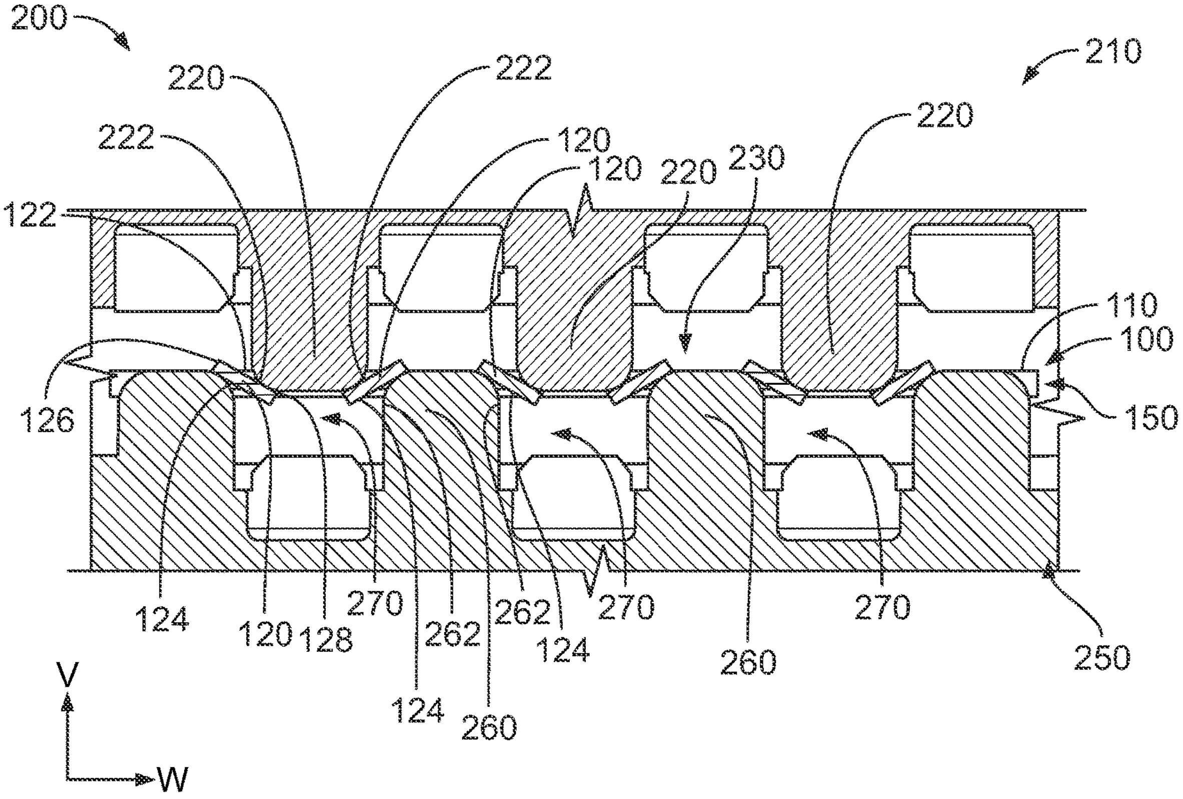
FIG. 5B is a sectional side view of a second step of mating the first cable housing with the second cable housing around the flat conductors.
Figure 5C:
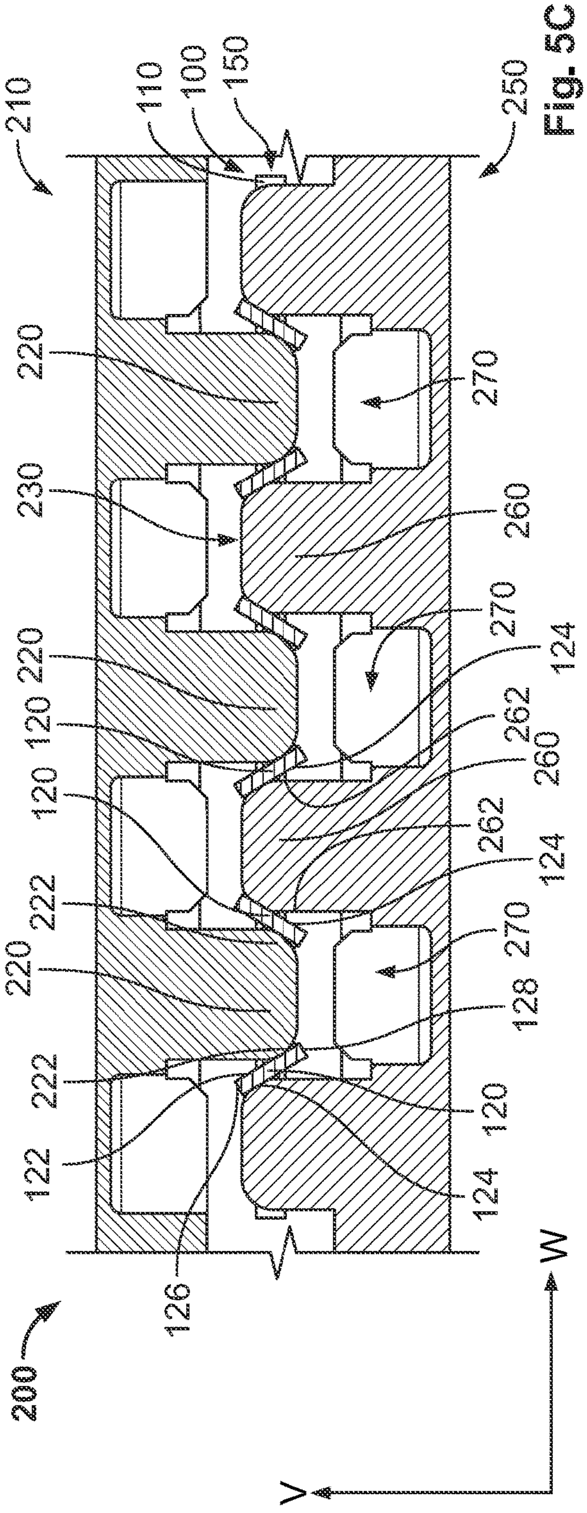
FIG. 5C is a sectional side view of a third step of mating the first cable housing with the second cable housing around the flat conductors.
Figure 5D:
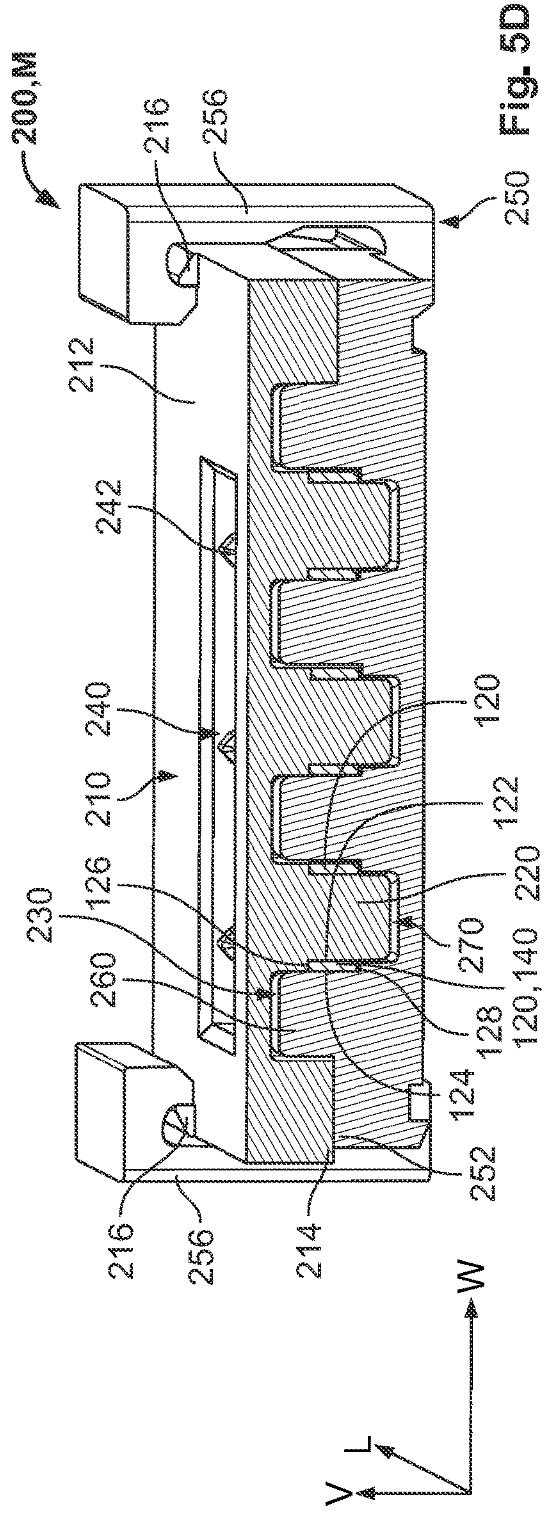
FIG. 5D is a sectional perspective view of a mated state of the first cable housing with the second cable housing around the flat conductors.

The first cable housing 210 is progressively moved toward the second cable housing 250 in the vertical direction V to mate with the second cable housing 250, as shown in FIGS. 5B and 5C. As the first cable housing 210 is moved toward the second cable housing 250, the first curved surfaces 222 of each of the first orientation guides 220 contact the first surface 122 of each of a pair of flat conductors 120. The second curved surfaces 262 of each of the second orientation guides 260 contact the second surface 124 of each of another pair of flat conductors 120. Due to the positioning of the first orientation guides 220 and the second orientation guides 260, each pair of flat conductors 120 contacted by one of the first orientation guides 220 is contacted by two second orientation guides 260 and, likewise, each pair of flat conductors 120 contacted by one of the second orientation guides 260 is contacted by two first orientation guides 220.

As shown in FIGS. 5B and 5C, as the first orientation guides 220 move into the second orientation openings 270 and the second orientation guides 260 move into the first orientation openings 230, the flat conductors 120 are rotated about the longitudinal direction L by interaction with the first curved surfaces 222 and the second curved surfaces 262. For each of the flat conductors 120, the first curved surface 222 contacts the first surface 122 at one of the first end 126 and the second end 128, and the second curved surface contacts the second surface 124 at the other of the first end 126 and the second end 128. When the orientation guides 220, 260 contact opposite ends 126, 128 of the flat conductors 120 while moving in opposite directions, the flat conductors 120 rotate about a center point of the flat conductors 120 and about the longitudinal direction L.

Figure 5E:
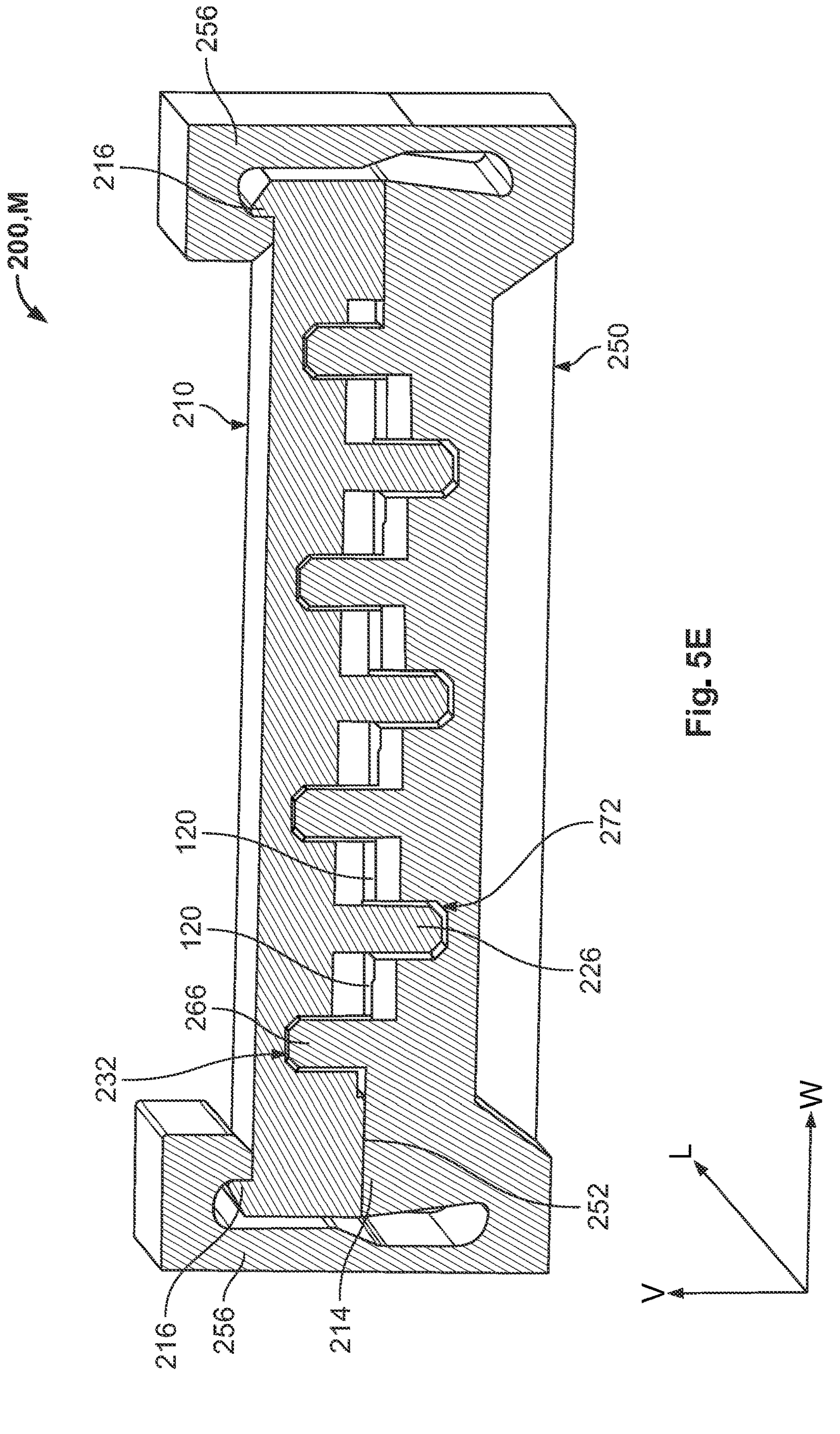
FIG. 5E is another sectional perspective view of the mated state of the first cable housing with the second cable housing around the flat conductors.

The cable housing 200 is shown in FIGS. 5D and 5E in a fully mated position M of the first cable housing 210 with the second cable housing 250. In the fully mated position M, the first lower surface 214 abuts the second upper surface 252. The first orientation guides 220 have been fully inserted into the second orientation openings 270 and the second orientation guides 260 have been fully inserted into the first orientation openings 230.

As shown in FIG. 5E, the first alignment walls 226 are aligned with the second alignment recesses 272 and the second alignment walls 266 are aligned with the first alignment recesses 232. When the first cable housing 210 is mated with the second cable housing 250, the first alignment walls 226 move into the second alignment recesses 272 along the vertical direction V and the second alignment walls 266 move into the first alignment recesses 232 along the vertical direction V. The first alignment walls 226 are fully inserted into and positioned in the second alignment recesses 272 in the mated position M and the second alignment walls 266 are fully inserted into and positioned in the first alignment recesses 232 in the mated position M. The insertion of the alignment walls 226, 266 into the respective alignment recesses 232, 272 further ensures that the first cable housing 210 and the second cable housing 250 are aligned along the width direction W and the longitudinal direction L during mating.

In the mated position M, as shown in FIG. 5D, the flat conductors 120 are fully rotated and held by the first orientation guides 220 and the second orientation guides 260. Due to the rotation caused by the first curved surfaces 222 and the second curved surfaces 262 during mating of the first cable housing 210 with the second cable housing 250, the flat conductors 120 in the mated position M of the cable housing 200 have a rotated portion 140 in the window 150 held between the first cable housing 210 and the second cable housing 250. Each of the first orientation guides 220 and the second orientation guides 260 provides symmetrical pressing forces to rotate the pair of flat conductors 120 at opposite curved surfaces 222, 262 and, consequently, the first orientation guides 220 and the second orientation guides 260 are not deflected or deformed in the width direction W during rotation of the flat conductors 120 or in the mated position M. The cable housing 200 can thus more reliably maintain the force necessary to hold the flat conductors 120 in the rotated orientation over time.

In a planar portion 130 of each of the flat conductors 120 in the insulation material 110, shown in FIG. 2, the first surface 122 and the second surface 124 remain parallel with an upper surface and a lower surface of the insulation material 11. The rotated portion 140 of the flat conductors 120 has a rotated orientation disposed at an angle with respect to the planar portion 130, which extends along a plane defined by the width direction W and the longitudinal direction L. In the embodiment shown in FIG. 5D, the angle is approximately 90° and the rotated portion 140 has an approximately perpendicular orientation to the planar portion 130. In other embodiments, for example with flat conductors 120 of different width and thickness than in the shown embodiment, the angle may be between 45° and 90°. In the fully mated state M shown in FIG. 5D, the rotated portion 140 of each of the flat conductors 120 is exposed in each of the termination passages 240 of the first cable housing 210.

Figure 8C:
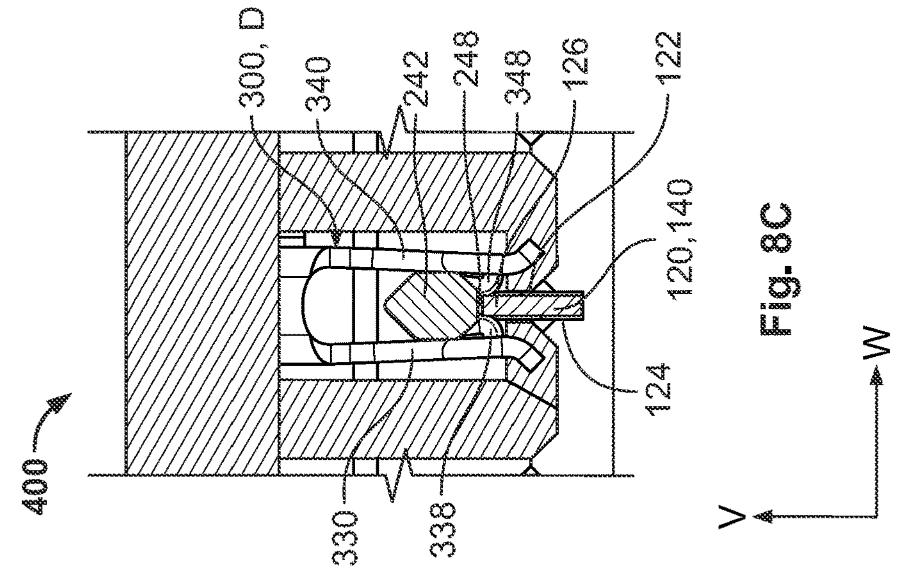
FIG. 8C is a sectional side view of a third step of inserting the terminal in the contact housing into the cable housing.
Figure 8B:
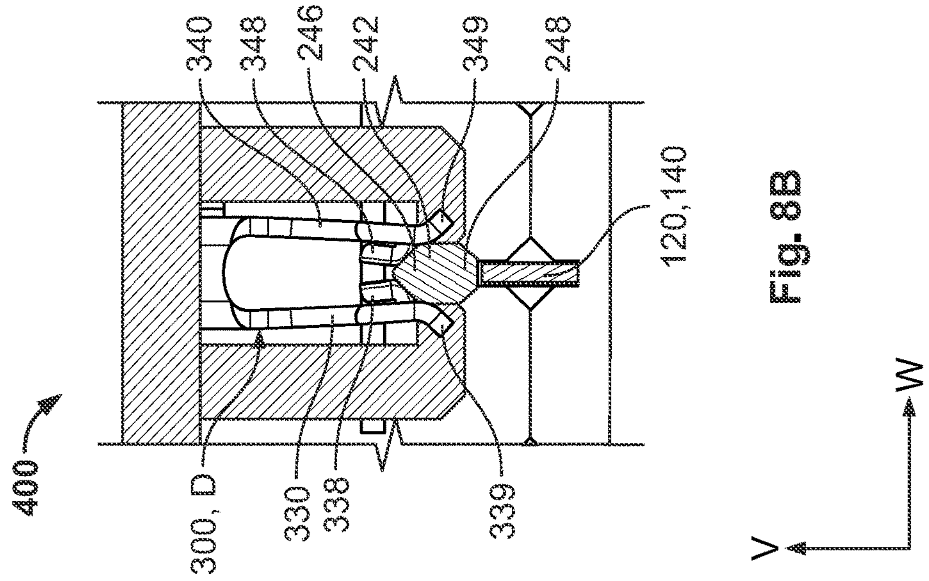
FIG. 8B is a sectional side view of a second step of inserting the terminal in the contact housing into the cable housing.
Figure 8A:
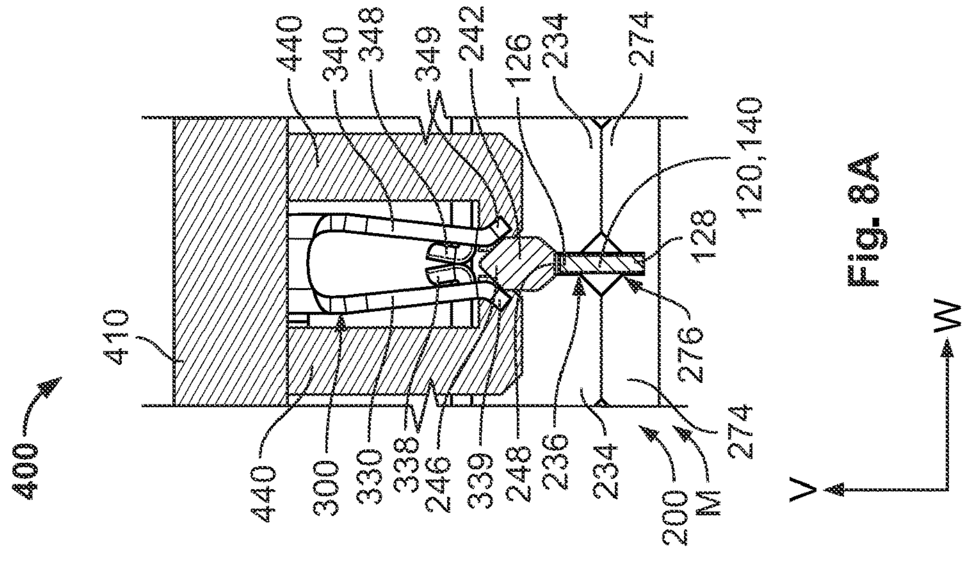
FIG. 8A is a sectional side view of a first step of inserting the terminal in the contact housing into the cable housing.

The rotated portion 140 of each of the flat conductors 120, in the mated position M of the cable housing 200, is held in one of the first notches 236 of the first support ribs 234 and one of the second notches 276 of the second support ribs 274, as shown in FIGS. 8A and 9. The first support ribs 234 are aligned with the second support ribs 274 in the vertical direction V in the mated position M. The first end 126 of each of the flat conductors 120 in the rotated portion 140 is disposed in one of the first notches 236. The second end 128 of each of the flat conductors 120 in the rotated portion 140 is disposed in one of the second notches 276. The positioning of the ends 126, 128 of the flat conductors 120 in the notches 236, 276 helps to hold the rotated portion 140 at the rotated orientation.

As shown in FIGS. 5D and 5E, the first cable housing 210 engages the second cable housing 250 to secure the cable housing 200 in the mated position M. The cable latch arms 256 each releasably engage one of the first catches 216 to secure the first cable housing 210 and the second cable housing 250 in the mated position M. In the shown embodiment, the cable latch arms 256 deflect during mating of the cable housings 210, 250 along the vertical direction V and elastically restore to the position shown in FIGS. 5D and 5E when the mated position M is reached. In other embodiments, the cable latch arms 256 and the first catches 216 may be other structural elements that releasably engage to secure the first cable housing 210 and the second cable housing 250 in the mated position M.

Figure 6:
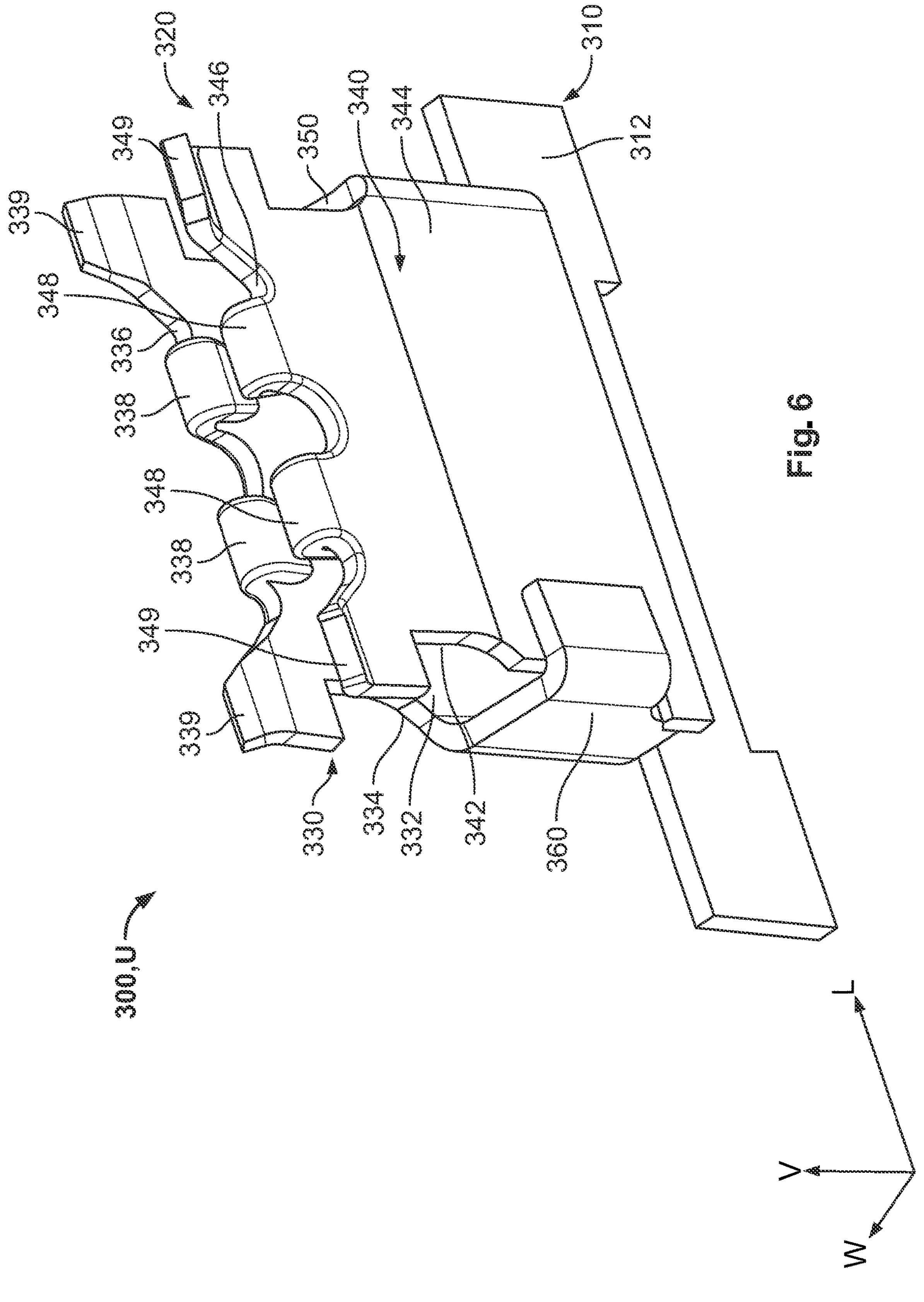
FIG. 6 is a perspective view of a terminal of the connector.

One of the terminals 300 of the connector 10 is shown in FIG. 6. The terminal 300 is shown in an undeformed state U in FIG. 6. The terminal 300 has a terminal base 310 and an elastic contact portion 320 extending from the terminal base 310. The terminal base 310, in the embodiment shown in FIG. 6, is a weld tab 312. In the shown embodiment, the weld tab 312 is a planar piece of material to which another element, such as a conductor of a cable, is configured to be welded. The elastic contact portion 320 has a first beam 330 and a second beam 340.

The first beam 330, as shown in FIG. 6, has an inner surface 332 and an outer surface 334 opposite the inner surface 332 in the width direction W. The first beam 330 extends from the terminal base 310 to a first end 336 opposite the terminal base 310 in the vertical direction V. At the first end 336, the first beam 330 has a pair of first contact points 338 positioned between and adjacent to a pair of first guide arms 339. The pair of first contact points 338 are each formed by a portion of the first beam 330 that is bent back toward the terminal base 310, forming each of the first contact points 338 as an element that protrudes toward the second beam 340 in the width direction W. The first guide arms 339 are each bent or flared in the width direction W away from the second beam 340.

The second beam 340, as shown in FIG. 6, has an inner surface 342 and an outer surface 344 opposite the inner surface 342 in the width direction W. The second beam 340 extends from the terminal base 310 to a second end 346 opposite the terminal base 310 in the vertical direction V. At the second end 346, the second beam 340 has a pair of second contact points 348 positioned between and adjacent to a pair of second guide arms 349. The pair of second contact points 348 are each formed by a portion of the second beam 340 that is bent back toward the terminal base 310, forming each of the second contact points 348 as an element that protrudes toward the first beam 330 in the width direction W. The second guide arms 349 are each bent or flared in the width direction W away from the first beam 330.

As shown in FIG. 6, a bend 350 of the terminal 300 in the elastic contact portion 320 connects the first beam 330 and the second beam 340. The terminal 300 has a support tab 360 extending from the first beam 330 and abutting the outer surface 344 of the second beam 340. In the shown embodiment, the support tab 360 is an L-shaped element. In other embodiments, the support tab 360 may have any structure that contacts the outer surface 344 of the second beam 340, and could alternatively extend from the second beam 340 to abut the outer surface 334 of the first beam 330.

The first beam 330 and the second beam 340 are resiliently deflectable with respect to each other in the width direction W shown in FIG. 6. The support tab 360 limits deflection of the second beam 340 away from the first beam 330. In the undeformed state U of the terminal 300 shown in FIG. 6, the first contact points 338 abut the second contact points 348 and the first beam 330 is spaced apart from the second beam 340. The first guide arms 339 are spaced apart from the second guide arms 349 in the undeformed state U.

The terminal 300 is formed of a conductive material, such as copper or aluminum. In the shown embodiment, the terminal 300 is monolithically formed in a single piece from the conductive material. In other embodiments, the terminal 300 can be assembled from a plurality of separate components to form the features of the terminal 300 described in detail above.

Figure 7:
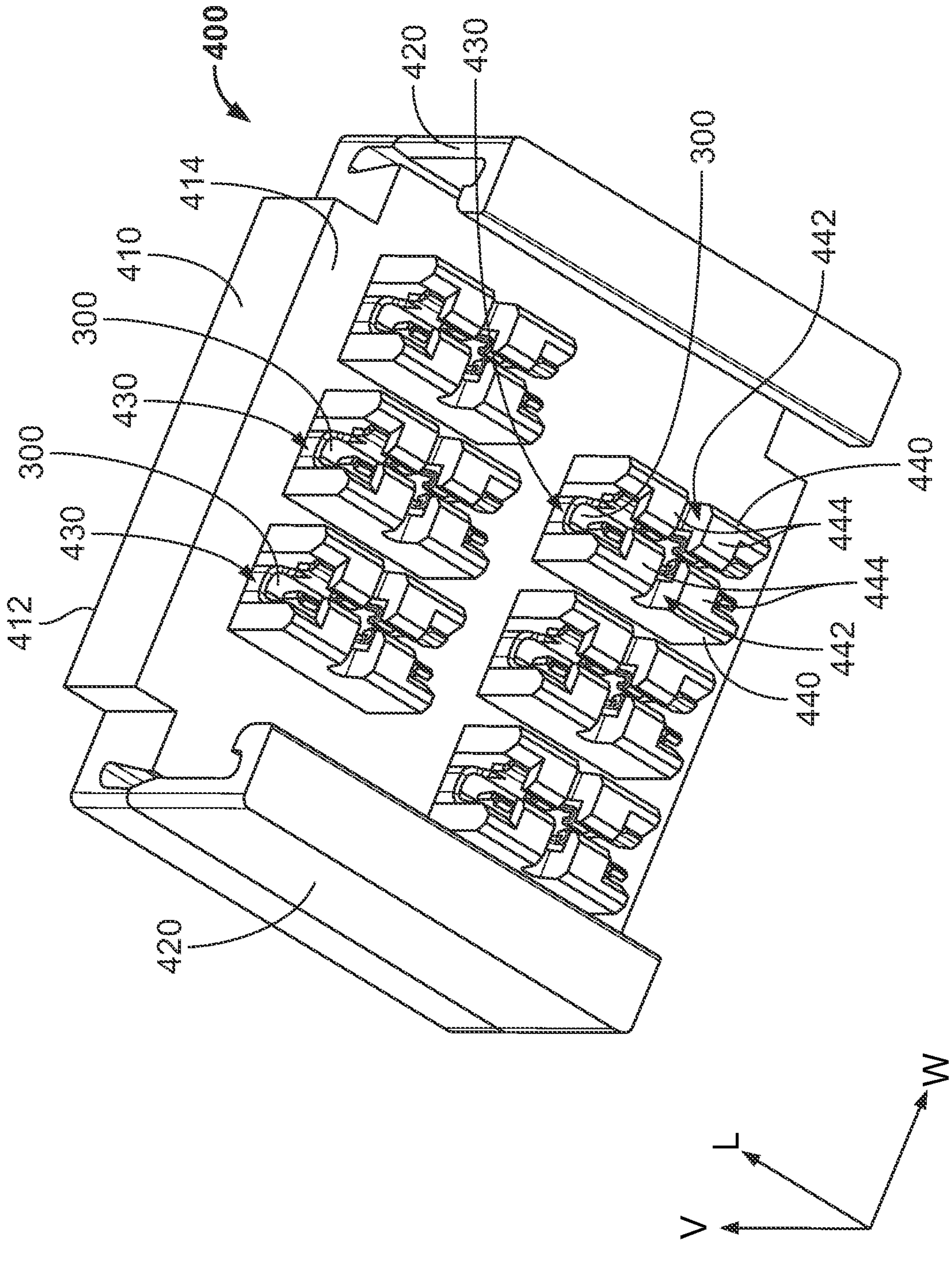
FIG. 7 is a perspective view of contact housing of the connector holding the terminals.

The contact housing 400, as shown in FIG. 7, has a housing base 410 with an outer surface 412 and an inner surface 414 opposite the outer surface 412 in the vertical direction V. The contact housing 400 has a pair of contact latch arms 420 extending from the housing base 410; the contact latch arms 420 extend from the outer surface 412 beyond the inner surface 414 in the vertical direction V. The contact latch arms 420 are resiliently deflectable with respect to the housing base 410.

As shown in FIG. 7, the contact housing 400 has a plurality of terminal passageways 430 extending through the housing base 410 from the outer surface 412 to the inner surface 414 in the vertical direction V. Each of the terminals 300 is positioned and held in one of the terminal passageways 430.

At each of the terminal passageways 430, the contact housing 400 has a pair of guard walls 440 bordering and defining a portion of the terminal passageway 430, as shown in FIG. 7. The guard walls 440 each extend in the vertical direction V from the inner surface 414 of the housing base 410 and have a rib opening 442 and an end flange 444 at an end opposite the inner surface 414. The rib opening 442 extends centrally into an end of the guard wall 440 and forms a passageway extending through the guard wall 440 in the width direction W. The end flange 444 extends perpendicularly to the guard wall 440 and overlaps the first contact points 338 and the second contact points 348 of the terminal 300 disposed in the adjacent terminal passageway 430. The end flange 444 does not overlap the first guide arms 339 or the second guide arms 349 of the terminal 300, which remain exposed along the vertical direction V.

The assembly of the contact housing 400 holding the terminals 300 with the cable housing 200 in the mated position M around the FFC 100 will now be described in greater detail with reference to FIGS. 8A-9.

The terminals 300 held in the contact housing 400 are inserted into the termination passages 240 of the first cable housing 210. Each of the terminals 300 contacts one of the protrusions 242 in the termination passages 240 during insertion. As shown in FIG. 8A, each of the protrusions 242 has a convex body with a pointed end 246 and a flat end 248 opposite the pointed end 246 in the vertical direction V. During insertion of the terminal 300 into the termination passage 240 along the vertical direction V, the first guide arms 339 and the second guide arms 349 first contact the protrusion 242 near the pointed end 246, as shown in FIG. 8A.

Upon further insertion in the vertical direction V, as shown in FIG. 8B, the first guide arms 339 and the second guide arms 349 move along the pointed end 246 of the protrusion 242 and are spread apart in the width direction W.

In this intermediate position, the terminal 300 is in a deflected state D in which the second beam 340 is deflected away from the first beam 330 and the first contact points 338 are separated from the second contact points 348. The support tab 360 restricts further deflection of the second beam 340 and increases a force urging the second beam 340 against the protrusion 242 and in a direction back toward the first beam 330.

The terminal 300 remains in the deflected state D as the terminal 300 is further inserted along the vertical direction V. When the terminal 300 reaches the position shown in FIG. 8C, the first contact points 338 and the second contact points 348 initially contact the rotated portion 140 of the flat conductor 120. In this position, the first beam 330 and the second beam 340 abut sides of the protrusion 242 to remain in the deflected state D and the first contact points 338 and second contacts points 348 separated from one another are aligned with the flat end 248 of the protrusion 242. The first contact points 338 and second contacts points 348 first contact the first end 126 of the flat conductor 120 and electrically connect the terminal 300 with the flat conductor 120.

The terminals 300 in the contact housing 400 are further inserted in the vertical direction V into the termination passage 240 until an assembled position A of the connector 10 is reached, shown in FIGS. 1 and 9. In the assembled position A, as shown in FIG. 9, the first beam 330 and the second beam 340 of the elastic contact portion 320 of each of the terminals 300 extends through the termination passage 240 and contacts the rotated portion 140 of one of the flat conductors 120 to electrically connect the terminal 300 to the flat conductor 120. The first contact points 338 and the second contact points 348 contact opposite surfaces of the rotated portion 140. The first contact points 338 and the second contact points 348 slide along the surface of the rotated portion 140 from the position shown in FIG. 8C to the assembled position A shown in FIG. 9, in which the first contact points 338 and the second contact points 348 are adjacent to the second end 128 of the flat conductor 120. The wiping of the contact points 338, 348 along the surface of the flat conductor 120 improves the electrical connection between the terminal 300 and the flat conductor 120.

The terminals 300 and the contact housing 400 holding the terminals 300 are secured in the assembled position A of the connector 10. As shown in FIG. 9, the contact latch arms 420 each releasably engage one of the second catches 258 of the second cable housing 250 in the assembled position A.

In the shown embodiment, the contact latch arms 420 deflect during mating with the contact housing 200 along the vertical direction V and elastically restore to the position shown in FIG. 9 when the assembled position A is reached. In other embodiments, the contact latch arms 420 and the second catches 258 may be other structural elements that releasably engage to secure the assembled position A.

Figure 11:
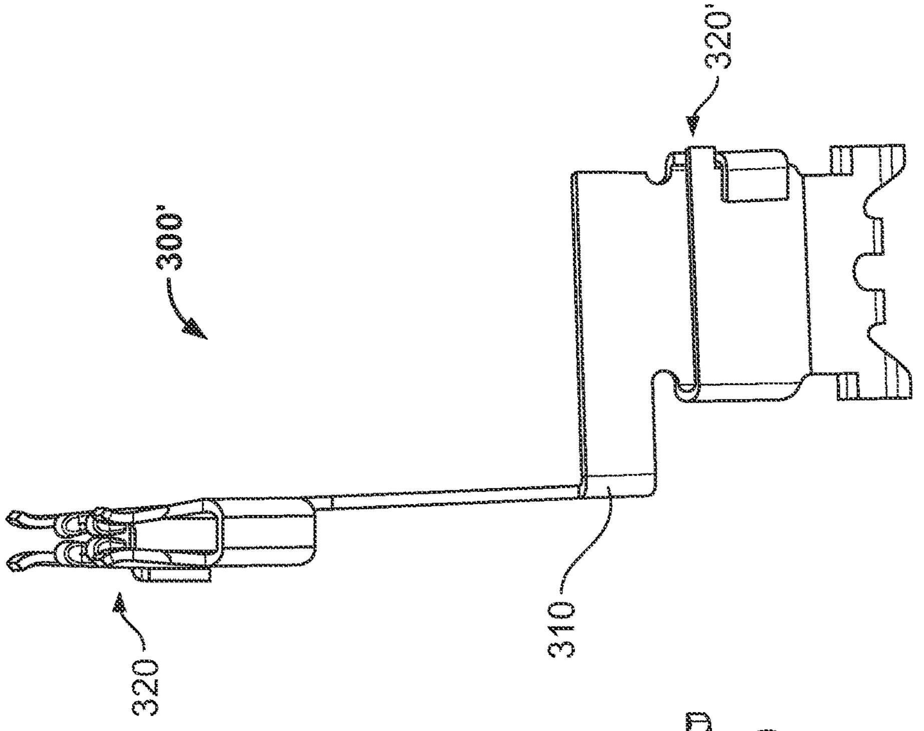
FIG. 11 is a perspective view of a terminal according to another embodiment.
Figure 10:
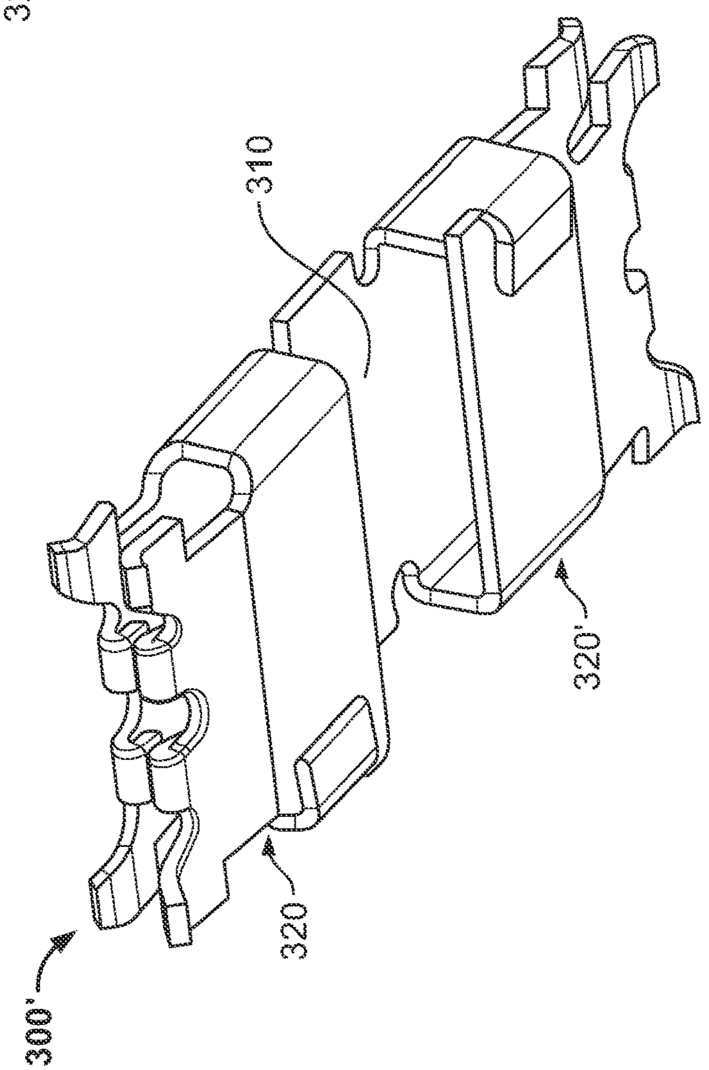
FIG. 10 is a perspective view of a terminal according to another embodiment.

In the embodiment shown in FIGS. 6-9, as described above, the terminal base 310 of the terminal 300 is a weld tab 312 configured to be welded to another conductive element, such as a conductor of a cable or a busbar. Other embodiments of the terminal 300 are shown in FIGS. 10 and 11. Like reference numbers refer to like elements and primarily the differences from the embodiment of the terminal 300 shown in FIG. 6 will be described in detail herein.

In the embodiments of the terminal 300' shown in FIGS. 10 and 11, the terminal base 310 is not a weld tab 312, but rather connects the elastic contact portion 320, referred to as a first elastic contact portion 320, to a second elastic contact portion 320' that is formed identically to the first elastic contact portion 320 described above. The second elastic contact portion 320' is positioned at an end of the terminal base 310 opposite the first elastic contact portion 310. In the embodiment shown in FIG. 10, the first elastic contact portion 320 is parallel to the second elastic contact portion 320'. In another embodiment shown in FIG. 11, the first elastic contact portion 320 is perpendicular to the second elastic contact portion 320'.

The terminals 300' in the embodiments shown in FIGS. 10 and 11 similarly connect to the rotated portions 140 of the flat conductors 120 but, instead of electrically connecting an element welded to the weld tab 312 to the flat conductors 120, allow for the connection of the rotated portions 140 of the flat conductors 120 of two FFCs 100 to one another in various orientations.

What is claimed is:

1. A cable housing for a flat flexible cable, comprising:

a first cable housing having a first orientation guide extending from a first lower surface of the first cable housing and a first orientation opening extending into the first lower surface; and a second cable housing having a second orientation opening extending into a second upper surface of the second cable housing and a second orientation guide extending from the second upper surface, a plurality of flat conductors exposed in a window extending through an insulation material of the flat flexible cable are disposed between the first cable housing and the second cable housing, the first orientation guide abuts a pair of flat conductors of the plurality of flat conductors and rotates a rotated portion of each of the flat conductors to a rotated orientation when the first orientation guide moves into the second orientation opening and the first cable housing is in a mated position with the second cable housing, the rotated orientation of the rotated portion is disposed at an angle with respect to a planar portion of each of the flat conductors in the insulation material, the second orientation guide abuts another pair of flat conductors of the plurality of flat conductors and rotates the rotated portion of each of the another pair of flat conductors to the rotated orientation when the second orientation guide moves into the first orientation opening.

2. The cable housing of claim 1, wherein the first orientation guide contacts a first surface of one of the flat conductors and the second orientation guide contacts a second surface of the one of the flat conductors when the first cable housing is mated with the second cable housing.

3. The cable housing of claim 1, wherein the first cable housing has a first alignment wall extending from the first lower surface and the second cable housing has a second alignment recess extending into the second upper surface, the first alignment wall is positioned in the second alignment recess in the mated position.

4. The cable housing of claim 3, wherein the second cable housing has a second alignment wall extending from the second upper surface and the first cable housing has a first alignment recess extending into the first lower surface, the second alignment wall is positioned in the first alignment recess in the mated position.

5. The cable housing of claim 1, wherein the first cable housing has a first catch on a first upper surface opposite the first lower surface, the second cable housing has a cable latch arm extending above the second upper surface, the cable latch arm engages the first catch and secures the first cable housing and the second cable housing in the mated position.

6. A cable housing for a flat flexible cable, comprising:

a first cable housing having a first orientation guide extending from a first lower surface of the first cable housing; and a second cable housing having a second orientation opening extending into a second upper surface of the second cable housing, a plurality of flat conductors exposed in a window extending through an insulation material of the flat flexible cable are disposed between the first cable housing and the second cable housing, the first orientation guide abuts a pair of flat conductors of the plurality of flat conductors and rotates a rotated portion of each of the flat conductors to a rotated orientation when the first orientation guide moves into the second orientation opening and the first cable housing is in a mated position with the second cable housing, the rotated orientation of the rotated portion is disposed at an angle with respect to a planar portion of each of the flat conductors in the insulation material, wherein the first cable housing has a plurality of first support ribs with a first notch disposed between the first support ribs, a first end of one of the flat conductors in the rotated portion is disposed in the first notch.

7. The cable housing of claim 6, wherein the second cable housing has a plurality of second support ribs with a second notch disposed between the second support ribs, the second support ribs are aligned with the first support ribs in the mated position and a second end of the one of the flat conductors in the rotated portion is disposed in the second notch.

8. A connector for a flat flexible cable, comprising:

a cable housing including a first cable housing and a second cable housing, the first cable housing having a termination passage extending through the first cable housing and a first orientation guide extending from a first lower surface of the first cable housing, the second cable housing having a second orientation opening extending into a second upper surface of the second cable housing, a flat conductor exposed in a window extending through an insulation material of the flat flexible cable is disposed between the first cable housing and the second cable housing, the first orientation guide abuts the flat conductor and rotates a rotated portion of the flat conductor to a rotated orientation when the first orientation guide moves into the second orientation opening and the first cable housing is in a mated position with the second cable housing, the rotated orientation of the rotated portion is disposed at an angle with respect to a planar portion of the flat conductor in the insulation material; and a terminal having an elastic contact portion extending through the termination passage and contacting the rotated portion of the flat conductor to electrically connect the terminal to the flat conductor.

9. The connector of claim 8, wherein the elastic contact portion has a first beam and a second beam resiliently deflectable with respect to the first beam, the first beam and the second beam contact opposite surfaces of the rotated portion of the flat conductor.

10. The connector of claim 9, wherein the terminal has a support tab extending from the first beam and abutting an outer surface of the second beam, the support tab limiting deflection of the second beam away from the first beam.

11. The connector of claim 9, wherein the first beam has a pair of first contact points and the second beam has a pair of second contact points, the first contact points abut the second contact points and the first beam is spaced apart from the second beam in an undeformed state of the terminal.

12. The connector of claim 11, wherein the first beam has a pair of first guide arms adjacent to the first contact points and the second beam has a pair of second guide arms adjacent to the second contact points, the first guide arms are spaced apart from the second guide arms in the undeformed state.

13. The connector of claim 12, wherein the first cable housing has a protrusion extending into the termination passage.

14. The connector of claim 13, wherein the first guide arms and the second guide arms contact the protrusion during insertion of the terminal into the termination passage, resiliently deflecting the second beam away from the first beam to a deflected state in which the first contact points are separated from the second contact points.

15. The connector of claim 14, wherein the first contact points and the second contact points initially contact the rotated portion of the flat conductor in the deflected state.

16. The connector of claim 8, further comprising a contact housing in which the terminal is disposed, the contact housing is secured to the cable housing in an assembled position in which the elastic contact portion contacts the rotated portion of the flat conductor.

17. The connector of claim 8, wherein the elastic contact portion extends from a terminal base of the terminal, the terminal base is a weld tab.

18. The connector of claim 8, wherein the elastic contact portion is a first elastic contact portion extending from a terminal base of the terminal and the terminal has a second elastic contact portion at an end of the terminal base opposite the first elastic contact portion.

19. The connector of claim 18, wherein the first elastic contact portion is parallel to the second elastic contact portion or the first elastic contact portion is perpendicular to the second elastic contact portion.

20. A cable housing for a flat flexible cable, comprising:

a first cable housing having:

a first orientation guide extending from a first lower surface of the first cable housing; and a first alignment wall extending from the first lower surface; and a first alignment recess extending into the first lower surface; and a second cable housing having:

a second alignment wall extending from the second upper surface;

a second orientation opening extending into a second upper surface of the second cable housing; and a second alignment recess extending into the second upper surface, a plurality of flat conductors exposed in a window extending through an insulation material of the flat flexible cable are disposed between the first cable housing and the second cable housing, the first orientation guide abuts a pair of flat conductors of the plurality of flat conductors and rotates a rotated portion of each of the flat conductors to a rotated orientation when the first orientation guide moves into the second orientation opening and the first cable housing is in a mated position with the second cable housing, the rotated orientation of the rotated portion is disposed at an angle with respect to a planar portion of each of the flat conductors in the insulation material, the first alignment wall is positioned in the second alignment recess in the mated position and the second alignment wall is positioned in the first alignment recess in the mated position.

* * * * *